United States Patent
Ferreyra et al.

(10) Patent No.: US 10,450,077 B2
(45) Date of Patent: Oct. 22, 2019

(54) FLIGHT TERMINATION FOR AIR VEHICLES

(71) Applicant: THE BOEING COMPANY, Chicago, IL (US)

(72) Inventors: Eduardo Gabriel Ferreyra, Chicago, IL (US); Enrique Emilio Serrot, Chicago, IL (US); Jose Luis Lemus, Chicago, IL (US); Jose Antonio Blanco, Chicago, IL (US); Nieves Lapena, Chicago, IL (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 15/149,019

(22) Filed: May 6, 2016

(65) Prior Publication Data

US 2016/0340049 A1 Nov. 24, 2016

(30) Foreign Application Priority Data

May 18, 2015 (EP) .................................... 15382256

(51) Int. Cl.
*B64D 25/00* (2006.01)
*B64D 17/80* (2006.01)
*B64C 39/02* (2006.01)
*H04L 29/08* (2006.01)

(52) U.S. Cl.
CPC ............ *B64D 25/00* (2013.01); *B64C 39/024* (2013.01); *B64D 17/80* (2013.01); *H04L 67/12* (2013.01); *B64C 2201/141* (2013.01); *B64C 2201/146* (2013.01); *B64C 2201/185* (2013.01)

(58) Field of Classification Search
CPC ........ B64C 2201/141; B64C 2201/146; B64C 2201/185; B64C 39/024; B64D 17/80; B64D 25/00; H04L 67/12
USPC ........................................................ 701/3, 23
See application file for complete search history.

(56) References Cited

U.S. PATENT DOCUMENTS

| | | | | |
|---|---|---|---|---|
| 4,057,206 A | * | 11/1977 | Duncan ................. | B64D 25/10 244/122 AE |
| 5,604,708 A | | 2/1997 | Helms et al. | |
| 5,890,441 A | * | 4/1999 | Swinson ............. | B64C 29/0025 244/12.1 |
| 5,899,414 A | | 5/1999 | Duffoo | |

(Continued)

FOREIGN PATENT DOCUMENTS

DE 4239638 A1 5/1994
DE 4421139 A1 12/1995

(Continued)

OTHER PUBLICATIONS

Extended European Search Report, Patent Application No. 15382256. 4, dated Sep. 30, 2015.

*Primary Examiner* — Angelina Shudy
(74) *Attorney, Agent, or Firm* — Haynes and Boone LLP

(57) ABSTRACT

The present disclosure refers to a method and a related system of flight termination for air vehicles. The method and the system of flight termination for air vehicles involve deploying a parachute for flight termination of an air vehicle. A flight termination system, which in turn comprises at least one microcontroller unit that is connected to at least one parachute deployment system for deploying an air vehicle's parachute when a major emergency is determined during an air vehicle's flight.

20 Claims, 2 Drawing Sheets

(56) References Cited

U.S. PATENT DOCUMENTS

Figure 1:
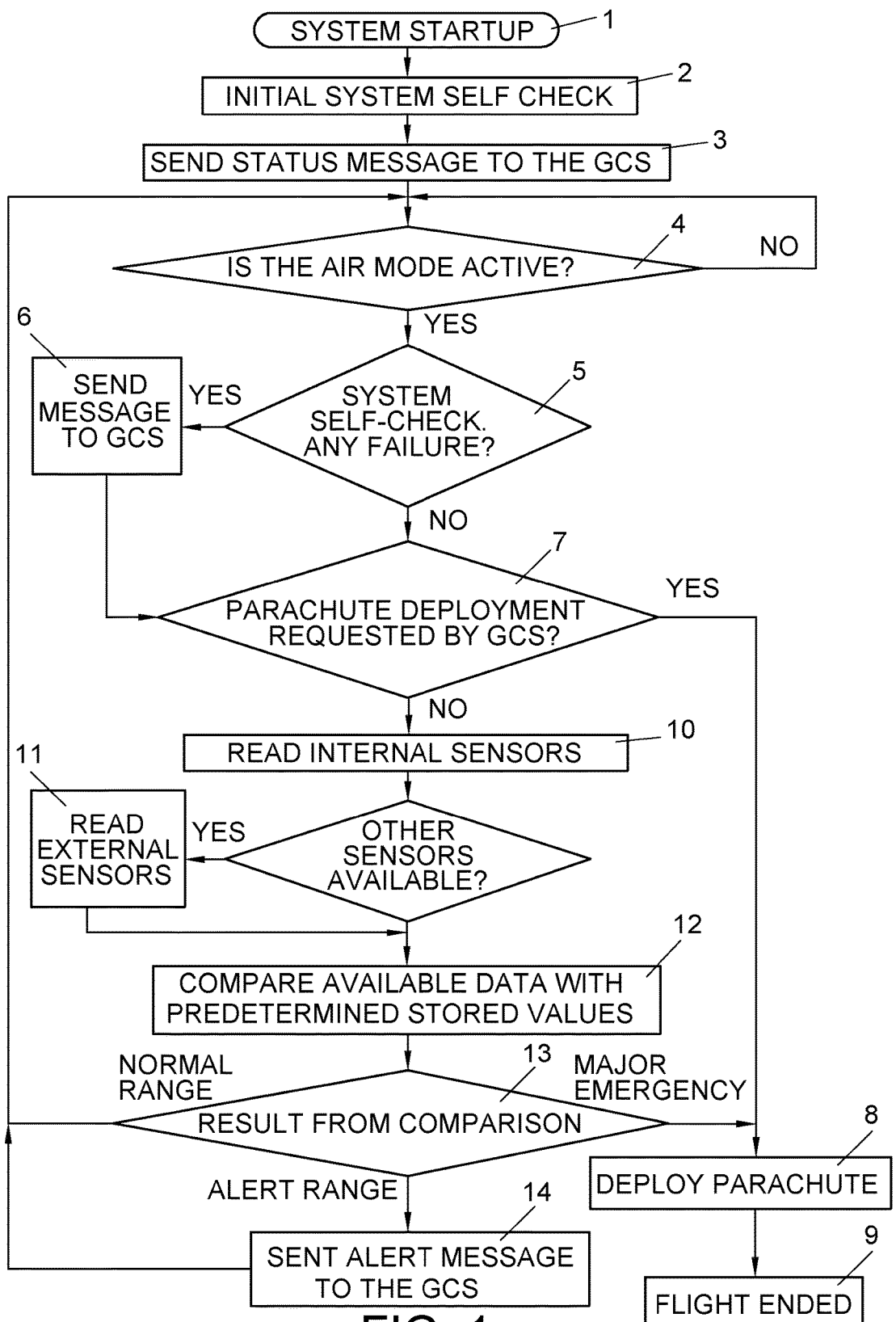

| | | | | |
|---|---|---|---|---|
| 6,056,237 A * | 5/2000 | Woodland | B64C 3/40 | 244/120 |
| 6,208,269 B1 * | 3/2001 | Brodie | B64D 25/08 | 244/122 AE |
| 6,626,398 B1 * | 9/2003 | Cox | B64C 39/024 | 244/45 R |
| 6,664,792 B1 | 12/2003 | Nguyen | | |
| 7,274,978 B1 * | 9/2007 | Carroll | B64C 39/024 | 244/190 |
| 7,487,939 B1 * | 2/2009 | Christof | B64D 17/80 | 244/139 |
| 7,778,744 B2 * | 8/2010 | Rath | G05D 1/101 | 244/120 |
| 9,033,281 B1 * | 5/2015 | Adams | B64D 9/00 | 244/190 |
| 9,051,043 B1 * | 6/2015 | Peeters | B64C 19/00 | |
| 9,273,981 B1 * | 3/2016 | Downey | B64C 39/024 | |
| 9,346,542 B2 * | 5/2016 | Leng | B64C 29/0025 | |
| 9,412,278 B1 * | 8/2016 | Gong | H04L 63/101 | |
| 9,592,912 B1 * | 3/2017 | Michini | G01C 15/02 | |
| 9,725,169 B2 * | 8/2017 | Lemus Martin | B64C 39/024 | |
| 9,747,808 B2 * | 8/2017 | Chambers | G08G 5/0069 | |
| 9,792,613 B2 * | 10/2017 | Gong | G06Q 30/018 | |
| 9,805,372 B2 * | 10/2017 | Gong | B64C 39/024 | |
| 9,805,607 B2 * | 10/2017 | Gong | G08G 5/006 | |
| 9,817,396 B1 * | 11/2017 | Takayama | G05D 1/0038 | |
| 9,845,165 B2 * | 12/2017 | Michalski | B64F 1/36 | |
| 9,870,566 B2 * | 1/2018 | Gong | G08G 5/0086 | |
| 10,082,803 B2 * | 9/2018 | Ham | B64C 39/024 | |
| 2003/0060943 A1 * | 3/2003 | Carroll | B64C 39/024 | 701/3 |
| 2003/0136876 A1 * | 7/2003 | Carroll | A63H 27/00 | 244/58 |
| 2006/0102798 A1 * | 5/2006 | Cox | B64C 1/26 | 244/190 |
| 2007/0145193 A1 * | 6/2007 | Hakki | B64D 17/80 | 244/139 |
| 2010/0004803 A1 * | 1/2010 | Manfredi | B64D 25/00 | 701/14 |
| 2010/0176246 A1 * | 7/2010 | Fleming, III | B64D 17/80 | 244/139 |
| 2014/0032034 A1 * | 1/2014 | Raptopoulos | G08G 5/0069 | 701/25 |
| 2014/0155098 A1 * | 6/2014 | Markham | H04B 1/0064 | 455/456.3 |
| 2015/0314869 A1 * | 11/2015 | Lemus Martin | B64C 39/024 | 701/3 |
| 2016/0167804 A1 * | 6/2016 | Serrot Hauke | B64F 1/08 | 701/2 |
| 2016/0189548 A1 * | 6/2016 | Thurling | G08G 5/0013 | 701/3 |
| 2016/0253908 A1 * | 9/2016 | Chambers | G08G 5/0069 | 701/2 |
| 2016/0274577 A1 * | 9/2016 | Heinonen | B64D 1/08 | |
| 2016/0284221 A1 * | 9/2016 | Hinkle | G08G 5/0034 | |
| 2016/0318601 A1 * | 11/2016 | Arnold | B64C 9/12 | |
| 2016/0318615 A1 * | 11/2016 | Pick | B64C 39/024 | |
| 2016/0347462 A1 * | 12/2016 | Clark | B64D 17/62 | |
| 2016/0376031 A1 * | 12/2016 | Michalski | B64F 1/36 | 701/15 |
| 2017/0006340 A1 * | 1/2017 | Enke | H04N 21/44028 | |
| 2017/0036771 A1 * | 2/2017 | Woodman | B64D 27/26 | |
| 2017/0129603 A1 * | 5/2017 | Raptopoulos | B64C 39/024 | |
| 2017/0154535 A1 * | 6/2017 | Downey | G08G 5/0039 | |
| 2017/0169713 A1 * | 6/2017 | Gong | G08G 5/006 | |
| 2017/0225792 A1 * | 8/2017 | Wang | B64D 17/70 | |
| 2017/0248969 A1 * | 8/2017 | Ham | B64C 39/024 | |
| 2017/0251096 A1 * | 8/2017 | Koepke | H04M 1/72538 | |
| 2017/0253334 A1 * | 9/2017 | Takayama | B64D 1/12 | |
| 2017/0278409 A1 * | 9/2017 | Johnson | G08G 5/0069 | |
| 2017/0285631 A1 * | 10/2017 | Bethke | G05D 1/0016 | |
| 2018/0004207 A1 * | 1/2018 | Michini | G05D 1/0088 | |
| 2018/0004231 A1 * | 1/2018 | Michini | G05D 1/101 | |
| 2018/0018881 A1 * | 1/2018 | Cui | G08G 5/006 | |
| 2018/0022456 A1 * | 1/2018 | Patrick | B64D 1/22 | |
| 2018/0072419 A1 * | 3/2018 | Burgess | B64D 1/12 | |
| 2018/0075759 A1 * | 3/2018 | Kim | G08G 5/0069 | |
| 2018/0095155 A1 * | 4/2018 | Soni | G08G 5/0013 | |
| 2018/0109767 A1 * | 4/2018 | Li | B64C 39/02 | |
| 2018/0327091 A1 * | 11/2018 | Burks | B64C 39/024 | |
| 2019/0002101 A1 * | 1/2019 | Penet | B64C 39/022 | |

FOREIGN PATENT DOCUMENTS

| | | | |
|---|---|---|---|
| DE | 10 2011 105 059 A1 | 12/2012 | |
| FR | 3 012 423 A1 | 5/2015 | |
| FR | 3012423 A1 * | 5/2015 | B64C 39/024 |
| WO | 2014/080409 A1 | 5/2014 | |

* cited by examiner

FLIGHT TERMINATION FOR AIR VEHICLES

CROSS-REFERENCE TO RELATED APPLICATION

This application claims priority to, and the benefit of, European Patent Application No. EP 15382256.4, filed on May 18, 2015, the entire disclosure of which is expressly incorporated by reference herein.

FIELD

The present disclosure relates to a system of flight termination for air vehicles, especially unmanned air vehicles (UAV's).

The present disclosure also relates to a method of flight termination for air vehicles, especially unmanned air vehicles (UAV's).

The system and method of the present disclosure are applicable in the field of Aeronautic Engineering and, more particularly, in the field of Electronics and Automatic Regulation for Avionics.

BACKGROUND

Unmanned aerial vehicles (UAV's) are used for many different tasks such as air traffic monitoring, surveillance, fire protection, disaster relief, military operations, etc. In the event of an emergency (e.g. caused by loss of link, severe meteorological conditions, etc.) there is always a risk of losing the aircraft, its payload, or both.

Therefore, some aircrafts have installed an emergency system to avoid destroying the platform or its payload. However, in order to deploy such system, it is necessary to have a strong radio link between the aircraft and the ground station in order to know the aircraft circumstances and take a decision.

A common emergency system installed in many aircrafts consists on deploying a parachute at the reception from the aircraft of a signal sent by a manual pilot or a GCS (Ground Control Station). Another common way of terminating a flight is to produce an asymmetry in the aircraft configuration by detaching an aircraft part, forcing the aircraft to crash. Some other ways of flight termination involve destroying the aircraft by, for example, providing an explosive within the aircraft which is activated upon receiving a direct order sent from a GCS or a manual pilot. All these methods have the inconvenience mentioned above, of needing a strong radio link between the aircraft and the ground station. The last two methods have the inconveniences derived from loosing the aircraft and its payload.

The first method mentioned above allows saving the platform (i.e. the aircraft) and maybe its payload, but it is not automatic, since it relies on the experience of a manual operator and also on his/her ability to react on time under an emergency situation.

However, in the event of an emergency due to either bad external conditions such as weather conditions or loss of link due to craggy terrain or interferences, or either due to bad internal conditions such as mechanic and/or electronic malfunction, software failure, etc., these circumstances can inevitably derive in loosing both the aircraft and its payload.

In order to overcome the mentioned drawbacks present in the state-of-the-art systems and methods for terminating flights, a novel system and method of flight termination for air vehicles is presented.

SUMMARY

The present disclosure refers to a method (which may eventually be a computer implemented method) of flight termination for air vehicles and a related system of flight termination for air vehicles.

Both method and flight termination system are especially intended for being used in unmanned air vehicles (UAV's), although they are also applicable for air vehicles with a manual pilot onboard.

The method of flight termination for air vehicles comprises deploying a parachute for flight termination of an air vehicle. The method comprises using a flight termination system which in turn comprises at least one microcontroller unit connected to at least one parachute deployment system for deploying an air vehicle's parachute when a major emergency is determined during an air vehicle flight, wherein: a. the flight termination system is located onboard the air vehicle; b. the flight termination system comprises internal sensors connected to the at least one microcontroller unit; and/or c. determination of a major emergency is based on comparing, with predetermined values, measurements taken by the internal sensors (or, eventually, on measurements taken by external sensors; that is, in some embodiments, the flight termination system may not comprise internal sensors, but it may be connected to external sensors and profit from the measurements taken by said external sensors; these external sensors may be onboard the air vehicle or alternatively, onboard another vehicle or in the ground).

In a possible embodiment of the method of flight termination for air vehicles, the method comprises comparing, with predetermined values, measurements taken by external sensors (in addition to the measurements taken by the internal sensors), wherein said external sensors comprise any combination of at least: sensors with which an air vehicle is conventionally equipped, located onboard the air vehicle; and/or sensors located outside the air vehicle, connected to the at least one microcontroller unit via radio.

In a possible embodiment of the method of flight termination for air vehicles, the method comprises connecting, via radio, the at least one microcontroller unit with any combination of at least: a manual pilot located outside/inside the air vehicle; an autopilot located/inside outside the air vehicle; and/or a control station located outside the air vehicle.

The method of flight termination for air vehicles comprises: a. detecting signals sent from any combination of at least the internal sensors and the external sensors, said signals comprising data with measurements taken by any combination of the internal sensors and the external sensors; b. comparing, with predetermined first range limits, the data comprised within signals detected; c. assessing whether the data comprised within detected signals are within predetermined first range limits, in which case the method continues awaiting reception of further signals; d. assessing whether the data comprised within detected signals are out of predetermined first range limits, in which case the method continues comparing, with predetermined critical range limits, the data comprised within detected signals; e. assessing whether the data comprised within detected signals are within predetermined critical range limits, in which case the method continues by: a.) sending an alert to a manual pilot, an autopilot or to a Control Station supervising the flight, and checking for reception of corresponding instructions for deploying a parachute, thus terminating the flight, b.) deploying the parachute if instructions are received in order to deploy the parachute, thus terminating the flight, and/or c.) awaiting detection of further signals if instructions in order to deploy the parachute are not received; and/or f. assessing whether the data comprised within detected signals are out of predetermined critical range limits, in which case the method continues by determining a major emergency situation, thus deploying the parachute and terminating the flight.

The method comprises assessing whether level of a battery provided for powering the flight termination system and parachute deployment, is sufficient for ensuring performance of internal sensors, microcontroller unit, and/or parachute deployment. If the level of the battery is sufficient but low, an alert is emitted. If the level is not sufficient for ensuring performance of internal sensors, microcontroller unit and/or parachute deployment at any time during the air vehicle flight, an insufficient battery level alert is emitted and the flight termination system is shut down.

Additionally, the method comprises, in a possible embodiment thereof, assessing whether the level of a battery provided for powering the air vehicle itself is sufficient for ensuring performance of the air vehicle, and emitting an alert if said level is low and/or not sufficient.

As already explained, the present disclosure refers to a system of flight termination for air vehicles.

According to a possible embodiment of the system of flight termination for air vehicles, the system either comprises or is connected to a parachute within a parachute deployment system.

The system of flight termination for air vehicles comprises at least one microcontroller unit connected to the parachute deployment system.

According to a preferred embodiment of the system of flight termination for air vehicles, the system comprises internal sensors connected to the at least one microcontroller unit, wherein said internal sensors are configured to measure flight and air-vehicle-related variables.

The at least one microcontroller unit is configured to activate the parachute deployment system and deploy an air vehicle's parachute when it determines a major emergency during air vehicle flight.

Determination of a major emergency is based on comparing, with predetermined values, data comprised within detected signals comprising measurements taken by the internal sensors (eventually, in case the system lack internal sensors but be connected to external sensors, the major emergency would be determined based on comparing, with predetermined values, data comprised within measurements taken by said external sensors).

According to a possible embodiment of the system of flight termination for air vehicles, the system comprises a radio transmitter connected to the at least one microcontroller unit, for communication between the at least one microcontroller unit and any combination of: a manual pilot located outside/inside the air vehicle; an autopilot located outside/inside the air vehicle; and/or a control station located outside the air vehicle.

According to a possible embodiment of the system of flight termination for air vehicles, the at least one microcontroller unit is connected to external sensors (in addition to the internal sensors), wherein said external sensors comprise any combination of at least: sensors with which an air vehicle is conventionally equipped, located onboard the air vehicle; and/or sensors located outside the air vehicle, connected to the at least one microcontroller unit via radio.

The internal/external sensors comprise any combination of at least: an Inertial Measurement Unit; a magnetometer; an altitude sensor; a barometer; a gyroscope; and/or a Global Positioning System receiver.

The system of flight termination for air vehicles comprises at least one battery provided for powering microcontroller unit and the internal sensors (in case there be internal sensors within the system) and, in a possible embodiment of the system, also provided for powering the parachute deployment system.

The system comprises a battery level measurement unit provided for measuring the level of the at least one battery.

The at least one microcontroller unit is configured to send an insufficient battery level alert and shut down the flight termination system if the at least one microcontroller unit detects a signal comprising data with measurement taken by the battery level measurement unit, said measurement indicating that battery level is insufficient for ensuring performance of internal sensors, microcontroller unit, and/or parachute deployment.

The at least one microcontroller unit is configured to: send an alert if it detects that the measurements taken by the internal/external sensors are out of predetermined first range limits but still within predetermined critical range limits, and check the reception of instructions in order to deploy the air vehicle's parachute, wherein if instructions are received in order to deploy the air vehicle's parachute, the system deploys the air vehicle's parachute, thus terminating the flight; and/or activate the parachute deployment system and deploy the air vehicle's parachute if it detects that the measurements taken by the internal sensors are out of predetermined critical range limits.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1: shows a schematic diagram of the different phases involved in an exemplary embodiment of the Method of Flight Termination for Air Vehicles, in accordance with at least one embodiment of the present disclosure.

Figure 2:
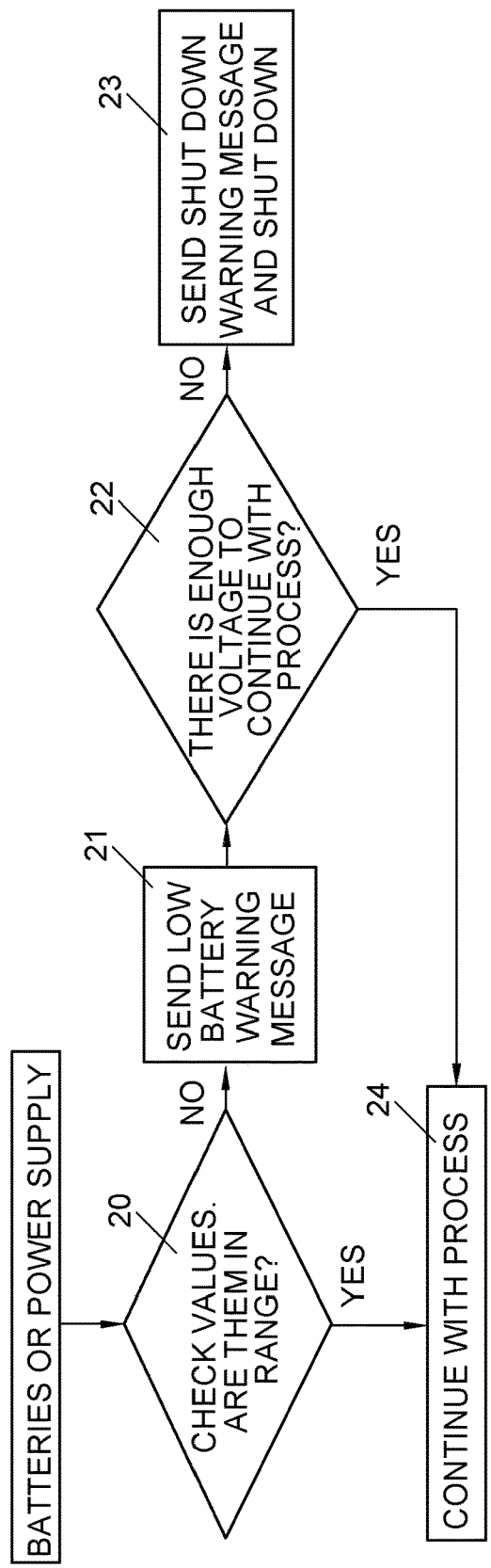

FIG. 2: shows a schematic diagram of the different phases involved in an initial self check stage, comprised within an exemplary embodiment of the flight termination method, in accordance with at least one embodiment of the present disclosure.

DESCRIPTION

The following is a description of an exemplary embodiment of the System and Method (which may be a Computer Implemented Method for instance) of Flight Termination for Air Vehicles.

According to a preferred embodiment of the Method of Flight Termination for Air Vehicles comprises, the method comprises receiving signals sent from internal sensors, said signals comprising measurements taken by said internal sensors, said internal sensors comprising any combination of at least a GPS unit, an Inertial Measurement Unit (IMU), an altimeter, a magnetometer, a barometer, a gyroscope, and a battery level measurement unit.

Said internal sensors, along with at least one microcontroller unit to which the internal sensors are connected, are comprised within an onboard flight termination system (FTS) of which the present method makes use.

The method also comprises, in a possible embodiment thereof, receiving signals sent from external sensors, wherein said external sensors are either located outside the aircraft or either located onboard the aircraft (being in this case sensors with which the aircraft is conventionally equipped), said signals comprising measurements taken by said external sensors, said external sensors comprising any combination of at least a GPS unit, an Inertial Measurement Unit (IMU), an altimeter, a magnetometer, a barometer, a gyroscope and a battery level measurement unit.

The method comprises verifying whether signals from internal/external sensors are detected, said signals comprising data comprising the aforementioned measurements taken either by internal/external sensors. The method comprises verifying in an independent manner whether said detected signals are received from internal sensors or from external sensors.

As already introduced, the method provides making use of external sensors, which are typically sensors provided within the aircraft. Although the method makes use of internal sensors too (which are additional sensors provided within an onboard flight termination system which implements the present method), the method also takes care of the measurements taken by external sensors (when available), for more redundancy, thus increasing its reliability.

When either signals from any of the internal sensors are not detected and/or signals from any of the external sensors are not detected, the method comprises sending an alert to a manual pilot or to a Control Station (located outside the aircraft, for example, onboard another aircraft or in the ground—GCS—) indicating that signals from one or more of the internal/external sensors are not being detected.

The method also comprises assessing whether radio transmission between the at least one microcontroller unit of the flight termination system onboard the aircraft and the manual pilot or the Control Station is enabled. The at least one microcontroller unit is connected to a radio transmitter (either provided within the flight termination system itself or either being the radio transmitter with which the aircraft is conventionally equipped) which in turn is connected to the manual pilot or the Control Station. If, as a result of this assessment, it is concluded that radio transmission between the at least one microcontroller unit and the manual pilot/Control Station is disabled, the method comprises continuing the flight in an autonomous manner, until said radio transmission is recovered.

When it is verified that signals from any of the internal/external sensors are not detected, as already explained, the method comprises sending an alert to a manual pilot and/or to a Control Station (a GCS for instance) supervising the flight, and wait for corresponding instructions for deploying a parachute, thus terminating the flight.

If instructions are sent in order to deploy the parachute, the flight is therefore terminated. If instructions are sent in order not to deploy the parachute, then the method continues by awaiting the reception of signals from internal/external sensors.

If, at any time during the execution of the method, a major emergency is detected, then the method comprises automatically deploying the parachute and terminating the flight.

A major emergency is considered a situation in which aircraft control is not recoverable. These situations may comprise, for example: loss of a critical part/component of the air vehicle, such as a wing, a horizontal/vertical stabilizer, part of the fuselage; for a helicopter, it may be loss of a blade, any structural failure, loss or malfunction of an engine, etc.; situations in which the air vehicle has initiated a non-stop maneuver, such as a spin, a critical stall, a rapid downward path, or the air vehicle is very close to the ground; in case of man-commanded air vehicles, situations in which the pilot has abandoned the cabin, or situations in which the pilot has fainted or is no longer able to command the aircraft; and/or situations in which, despite all components working properly, the air vehicle is flying out of its predetermined flying field.

If signals from either internal/external sensors are received/detected, these signals comprising data comprising measurements taken by these internal/external sensors, then the method comprises assessing whether the values of these data are within predetermined range limits. If these values are found within predetermined range limits, then the method continues by awaiting the reception of new signals from internal/external sensors.

If the latter values are found to be out of predetermined range limits, then the method comprises assessing whether these values are within predetermined critical range limits. If these values are found to be out of predetermined critical range limits, then the method determines there is a major emergency and continues by automatically deploying the parachute and terminating the flight.

If the latter assessment concludes that the values of the data sent by the internal/external sensors are within predetermined critical range limits, then the method comprises sending an alert to a manual pilot and or to a Control Station supervising the flight, and waiting for corresponding instructions for deploying a parachute, thus terminating the flight. If instructions are sent in order to deploy the parachute, then the method comprises deploying the parachute, thus terminating the flight. If instructions are sent in order not to deploy the parachute, then the method continues by awaiting the reception of signals from internal/external sensors.

The method further comprises deploying the parachute and terminating the flight if, at any time during the execution of the method, a direct order explicitly indicating that the flight must be terminated is sent from a manual pilot or a Control Station to the UAV.

The aforementioned flight termination system comprising the internal sensors and the at least one microcontroller unit comprises a battery.

The method additionally comprises (see FIG. 2) checking (20), before starting a flight, the battery level of the flight termination system, and also checking (22), before starting the flight, whether battery level of the flight termination system is enough for accomplishing the mission required for the UAV.

If the battery level is not enough, the method comprises emitting a warning message (23) indicating insufficient battery level and shutting down the mentioned flight termination system. If the battery level is found enough, but still not full, the method comprises emitting (21) a low-battery-level alert and continuing with the process (24).

The method also comprises checking the air vehicle's battery, i.e. the battery allowing the air vehicle to fly. The method comprises sending an alert to the manual pilot and/or to the Control Station indicating that the level of the air vehicle's battery is low or that the air vehicle's battery is empty.

As has already been introduced, the present disclosure also refers to a system of flight termination for air vehicles. The system of flight termination for air vehicles according to the present disclosure comprises any combination of at least the following components: at least one Inertial Measurement Unit (IMU); at least one magnetometer (preferably a digital magnetometer); at least one altitude sensor (typically a barometric altitude sensor); at least one barometer; at least one gyroscope; at least one Global Positioning System (GPS) receiver; at least one battery level measurement unit; at least one microcontroller unit; at least one parachute deployment system; at least one radio transmitter unit, for sending and receiving radio signals; and/or at least one battery to power all aforementioned components.

The mentioned components are located on board the air vehicle. The first seven components mentioned above are named internal sensors of the system.

The system therefore comprises all the necessary components for autonomously taking a decision of flight termination and actually deploying a parachute for terminating the flight, even if no signal/radio signal from an autopilot, a manual pilot or a Control Station (a GCS for instance) is received by the radio transmitter unit.

The system comprises, according to a possible embodiment thereof, a connection to external sensors, said external sensors being the sensors with which the air vehicle is conventionally equipped and/or even sensors which may be not located on board, which send signals comprising data according to measurements of said sensors, to the at least one microcontroller unit. These external sensors comprise any combination of at least a GPS unit, an Inertial Measurement Unit (IMU), an altimeter, a magnetometer, a barometer, a gyroscope and a battery level measurement unit.

The system detects signals from its internal sensors and, if connection to external sensors is available, receives and detects signals from external sensors too. The signals from external sensors (if available) may be sent to the at least one microcontroller unit either by cable (in external sensors are onboard and such connection is available) or either via radio transmission through the radio transmitter unit.

The system detects, at any time during the flight, if a major emergency situation occurs, in which case the system automatically deploys the parachute, thus terminating the flight. A major emergency is considered to be a situation in which aircraft control cannot be recovered.

The system compares with predetermined values the data comprised within the signals received from internal/external sensors, said data comprising measurements taken by said internal/external sensors, and then the system determines whether said data are within predetermined range limits or out of predetermined range limits.

If the data comprised within the signals are within predetermined range limits, the system keeps awaiting for the reception/detection of more signals.

If the data comprised within the signals are out of predetermined range limits, then the system assesses whether said data are within predetermined critical range limits.

If the data are out of predetermined critical range limits, then the system determines there is a major emergency situation, and automatically deploys the parachute, thus terminating the flight.

If the data are within predetermined critical range limits, then the system sends an alert to a manual pilot, autopilot and/or to a Control Station supervising the flight, and waits for corresponding instructions for deploying a parachute, thus terminating the flight. If instructions are sent in order to deploy the parachute, the parachute is deployed and the flight is therefore terminated. If instructions are sent in order not to deploy the parachute, then the system continues by awaiting the reception/detection of signals from internal/external sensors.

The microcontroller unit analyzes the data comprised within said signals and compares said data with predetermined range limits and with predetermined critical range limits.

Depending on the assessment derived from the previous comparison, the microcontroller unit either suggests deploying the parachute to a Control Station or a manual pilot/autopilot, or either directly decides deploying the parachute to save the air vehicle and/or its payload, if the situation is assessed as being of major emergency, as described above.

A basic example of an algorithm that is used by the microcontroller to assess whether the parachute must be deployed or not is as follows: 1. a gyroscopic unit (from IMU) gives a Z axis value that is increasing in time and exceeds normal gyroscopic values for a flight; 2. a barometric sensor gives a height value that is decreasing in time. Nevertheless, the altitude is still safe and above an emergency threshold; 3. the system of flight termination (Flight Termination System—FTS —) suggests parachute deployment to the Control Station, given that the situation is not critical (it is not considered as a major emergency) and the manual pilot or autopilot could still take control of the aircraft; and/or 4. if the aircraft continues in this situation during a predefined time or until it reaches a predefined minimum flying altitude, the system automatically takes charge stopping the engine (if applies) and deploying the parachute.

The possible existence of external sensors which, in addition to the internal sensors of the system, may be connected to said system, stands for a redundancy which contributes to a more precise situation analysis.

An example of a possible integration with the autopilot may be: the autopilot informs the Flight Termination System (FTS) of the no-fly zones, including an envelope of the desired route or airspace; nonetheless, for any reason, the air vehicle begins entering in a no-fly zone; and/or the system suggests parachute deployment to the GCS.

The System of Flight Termination for Air Vehicles comprises, according to a preferred embodiment thereof, at least one module comprising a software according to the method described above.

In a possible embodiment of the system of flight termination for air vehicles, the system itself does not comprise a radio receiver unit, but is connected to air vehicle's autopilot which is in turn connected via radio link to the GCS.

Nevertheless, the system is designed as a standalone device to be easily installed on an air vehicle and thus, it is capable of working without connection to an air vehicle's autopilot.

The system is powered by its own battery, adequately sized to deploy the parachute. Thus, the system is fully autonomous. Furthermore, although capable of receiving signals comprising data with measurements taken by external sensors, the system relies only in the readings of its own internal sensors to deploy the parachute.

FIGS. 1 and 2 show schematic diagrams of different phases comprised within an exemplary embodiment of the method of flight termination for air vehicles.

According to the embodiment depicted in FIG. 1, the method comprises: a. initializing (1) the Flight Termination System (FTS Startup or System Startup); b. performing an initial self check (2), wherein it is checked both that data sent from each of the FTS's internal sensors is being received and that there is enough level of battery (this stage is more precisely defined in FIG. 2). At this stage, it is checked whether the level of the battery (or batteries) of the System itself is sufficient, but it may also be checked whether the air vehicle's battery level is sufficient to perform the flight; c. sending an status message (3) to a Control Station (a Ground Control Station, GCS, for instance), comprising a report with the results of the checks performed in the previous stage); d. checking (4) whether the system is in air mode: if the system is not in air mode (it meaning that the air vehicle is still on land), the air vehicle's parachute deployment is inhibited, thus preventing from any accidental parachute launch which could cause injuries to operators which could eventually be manipulating the air vehicle and/or the flight termination system; e. if the system is in air mode (it meaning that the air vehicle is on air), the method comprises performing once again (5) a self check, and sending (6) a status message to the Control Station (a GCS for instance) if any failure is detected; f. the next step of the method comprises checking whether a manual pilot or the Control Station (a GCS for instance) has requested deployment of the air vehicle's parachute (7); g. if it has, the system activates the parachute deployment system and the parachute is deployed (8), thus terminating the flight (9); h. if no request has been received in order to deploy the parachute, the method comprises reading the measurements taken by its internal sensors (10) and, if available, also the measurements (11) taken by external sensors (which could be the conventional sensors provided within the aircraft for measuring flight and aircraft internal variables); i. the method comprises comparing (12) said measurements with predetermined stored values or limits (predetermined first range limits and predetermined critical range limits); and/or j. as a result of the previous comparison (13), it could be determined: a.) that measurements are within predetermined first limits (normal range), in which case the method returns to the step (4) in which it is checked whether the system is in air mode, b.) that measurements are out of predetermined first range limits, but still within predetermined critical range limits (alert range), in which case the method comprises sending an alert message (14) to the Control Station (GCS for instance) and returning to the step (4) in which it is checked whether the system is in air mode, and/or c.) that measurements are out of predetermined critical range limits (major emergency) in which case the system automatically activates the parachute deployment system and deploys the parachute (8), thus terminating the flight (9).

All the steps or phases of the method are performed cyclically in such a manner that, if no command is received in a certain moment (sent from a manual pilot, an autopilot or a Control Station) in order to deploy the air vehicle's parachute, the method keeps on checking the measurements taken by the internal/external sensors, for said measurements could eventually vary, that meaning that the air vehicle's status has shifted from normal range to an alert range (or vice versa), from a normal range to a major emergency (or vice versa), or from an alert range to a major emergency (or vice versa).

In a possible embodiment of the system of flight termination for air vehicles, the system lacks internal sensors, and only takes into account measurements taken by external sensors for comparing them with predetermined values and assessing whether or not it is necessary to deploy the air vehicle's parachute.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method of flight termination for an air vehicle, the method comprising:
    sensing, by sensors of the air vehicle, measurements, wherein the sensors are connected to at least one microcontroller unit of the air vehicle;
    sending an alert message, by the at least one microcontroller unit, when the at least one microcontroller unit determines that the measurements are within predetermined critical range limits;
    deploying, with at least one parachute deployment system of the air vehicle, a parachute of the air vehicle for flight termination of the air vehicle, when the at least one microcontroller unit of the air vehicle determines that the measurements are not within predetermined normal range limits and not within the predetermined critical range limits, wherein the at least one microcontroller unit is connected to the at least one parachute deployment system; and
    communicating, via a radio transmitter connected to the at least one microcontroller unit, between the at least one microcontroller unit with at least one of: a manual pilot located at least one of outside or inside the air vehicle; an autopilot located at least one of inside or outside the air vehicle; or a control station located outside the air vehicle.

2. The method of claim 1, wherein the sensors comprise internal sensors.

3. The method of claim 2, wherein the internal sensors comprise at least one of: an inertial measurement unit, a magnetometer, an altitude sensor, a barometer, a gyroscope, or a global positioning system receiver.

4. The method of claim 1, wherein the sensors comprise external sensors.

5. The method of claim 4, wherein the external sensors comprise sensors with which the air vehicle is conventionally equipped, which are located onboard the air vehicle.

6. The method of claim 4, wherein the external sensors comprise sensors located outside the air vehicle, which are connected to the at least one microcontroller unit via a radio.

7. The method of claim 1, wherein the method further comprises:
   determining, by the at least one microcontroller unit of the air vehicle, whether the measurements are found to be within the predetermined normal range limits;
   when the at least one microcontroller unit determines that the measurements are within the predetermined normal range limits, awaiting for further measurements;
   determining, by the at least one microcontroller unit, whether the measurements are found to be within the predetermined critical range limits, when the at least one microcontroller unit determines that the measurements are not within the predetermined normal range limits; and
   when the at least one microcontroller unit determines that measurements are within the predetermined critical range limits: checking for reception of instructions for deploying the parachute,
      deploying the parachute, if the instructions for deploying the parachute are received, and
      awaiting detection of the further measurements, if the instructions for deploying the parachute are not received.

8. The method of claim 1, wherein the method further comprises assessing whether a level of at least one battery provided for powering the sensors, the at least one microcontroller unit, and the parachute deployment system, is sufficient for ensuring performance of at least one of: the sensors, the at least one microcontroller unit, or the parachute deployment system.

9. The method of claim 8, wherein the method further comprises emitting an insufficient battery level alert and shutting down the sensors, the at least one microcontroller unit, and the parachute deployment system, when the at least one microcontroller unit of the air vehicle determines that the level of the at least one battery is not sufficient for ensuring performance of at least one of: the sensors, the at least one microcontroller unit, or the parachute deployment system at any time during the flight.

10. The method of claim 1, wherein the method further comprising powering, by at least one battery, the at least one microcontroller unit, the at least one parachute deployment system, and the sensors.

11. The method of claim 10, wherein the method further comprises measuring, by a battery level measurement unit, a level of the at least one battery.

12. The method of claim 1, wherein the air vehicle is an unmanned air vehicle (UAV).

13. A system of flight termination for an air vehicle comprises:
   a parachute;
   at least one microcontroller unit connected to a parachute deployment system; and
   sensors connected to the at least one microcontroller unit, wherein the sensors measure measurements comprising flight and air vehicle related variables,
   wherein the at least one microcontroller unit sends an alert message, when the at least one microcontroller unit determines that the measurements are within predetermined critical range limits,
   wherein the at least one microcontroller unit activates the parachute deployment system to deploy the parachute, when the at least one microcontroller unit determines that the measurements are not within predetermined normal range limits and not within the predetermined critical range limits; and
   a radio transmitter, connected to the at least one microcontroller unit, for communication between the at least one microcontroller unit and at least one of: a manual pilot located at least one of outside or inside the air vehicle, an autopilot located at least one of inside or outside of the air vehicle, or a control station located outside of the air vehicle.

14. The system of claim 13, wherein the sensors comprise external sensors, wherein the external sensors comprise at least one of: sensors with which the air vehicle is conventionally equipped, which are located onboard the air vehicle, or sensors located outside the air vehicle, which are connected to the at least one microcontroller unit via a radio.

15. The system of claim 13, wherein the sensors comprise internal sensors, wherein the internal sensors comprise at least one of: an inertial measurement unit, a magnetometer, an altitude sensor, a barometer, a gyroscope, or a global positioning system receiver.

16. The system of claim 13, wherein the sensors comprise external sensors, wherein the external sensors comprise at least one of: an inertial measurement unit, a magnetometer, an altitude sensor, a barometer, a gyroscope, or a global positioning system receiver.

17. The system of claim 13, wherein the system further comprises at least one battery for powering the parachute deployment system, the at least one microcontroller unit, and the sensors.

18. The system of claim 17, wherein the system further comprises a battery level measurement unit for measuring a level of the at least one battery.

19. The system of claim 18, wherein the at least one microcontroller unit is configured to send an insufficient battery level alert and shut down the sensors, the at least one microcontroller unit, and the parachute deployment system, when the at least one microcontroller unit detects a signal from the battery level measurement unit comprising data with the level of the at least one battery, wherein the level of the at least one battery indicates that the level of the at least one battery is insufficient for ensuring performance of at least one of: internal sensors, the at least one microcontroller unit, or the parachute deployment system.

20. The system of claim 13, wherein the at least one microcontroller unit is configured to:
   determine whether the measurements are found to be within the predetermined normal range limits,
   await for further measurements, when the at least one microcontroller determines that the measurements are within the predetermined normal range limits;
   determine whether the measurements are found to be within the predetermined critical range limits, when the at least one microcontroller unit determines that the measurements are not within the predetermined normal range limits; and
   check whether instructions for deploying the parachute are received, and the parachute is deployed, when the at least one microcontroller unit determines that the instructions for deploying the parachute are received, when the at least one microcontroller unit determines that the measurements from the sensors are within the predetermined critical range limits.

* * * * *